J. WALTER.
ATTACHMENT FOR MOWING MACHINES.
APPLICATION FILED NOV. 29, 1910.

1,053,459.

Patented Feb. 18, 1913.

2 SHEETS—SHEET 1.

Witnesses
C. R. Hardy
O. B. Hopkins

Inventor
John Walter
by H. B. Willson & Co
Attorneys

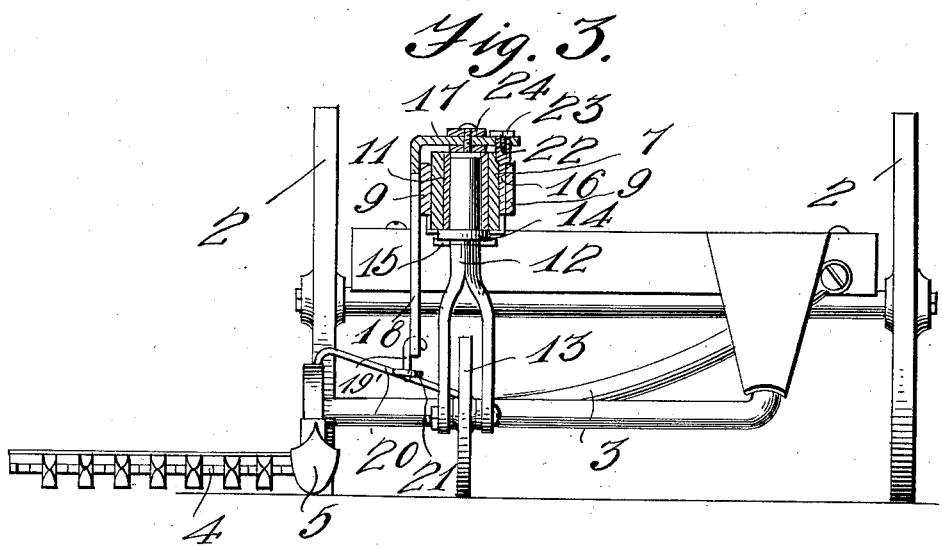
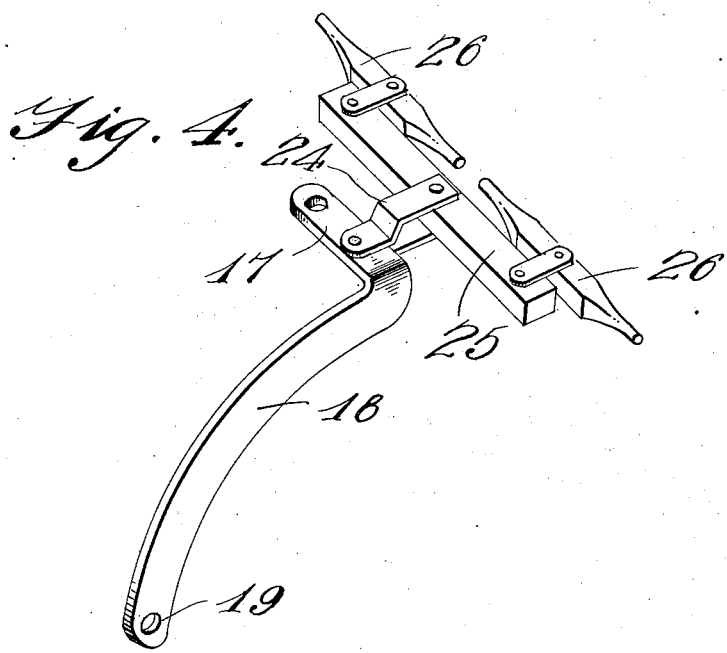

UNITED STATES PATENT OFFICE.

JOHN WALTER, OF YATES CENTER, KANSAS.

ATTACHMENT FOR MOWING-MACHINES.

1,053,459.  Specification of Letters Patent.  Patented Feb. 18, 1913.

Application filed November 29, 1910. Serial No. 594,650.

*To all whom it may concern:*

Be it known that I, JOHN WALTER, a citizen of the United States, residing at Yates Center, in the county of Woodson and State of Kansas, have invented certain new and useful Improvements in Attachments for Mowing-Machines; and I do declare the following to be a full, clear, and exact description of the invention, such as will enable others skilled in the art to which it appertains to make and use the same.

This invention relates to attachments for mowing machines.

One object of the invention is to provide an improved draft attachment for mowing machines by means of which the side draft of the machine is eliminated.

Another object is to provide an improved means for supporting the tongue of the machine whereby the weight and strain of the same are removed from the necks of the draft animals.

With these and other objects in view, the invention consists of certain novel features of construction, combination and arrangement of parts, as will be more fully described and particularly pointed out in the appended claim.

Figure 1:
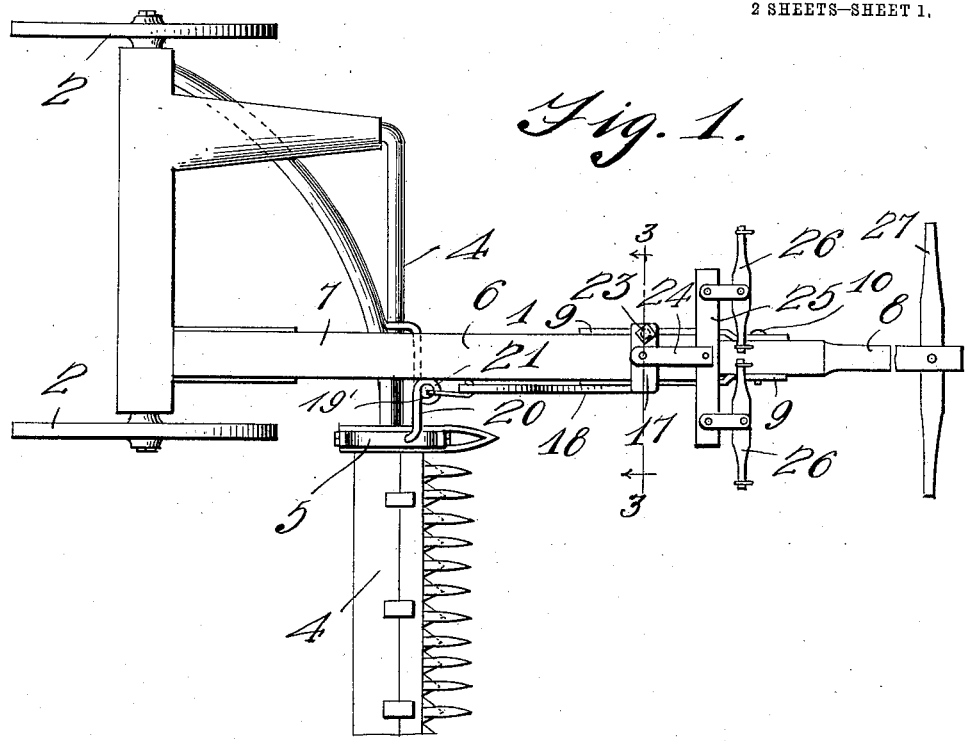
Figure 2:
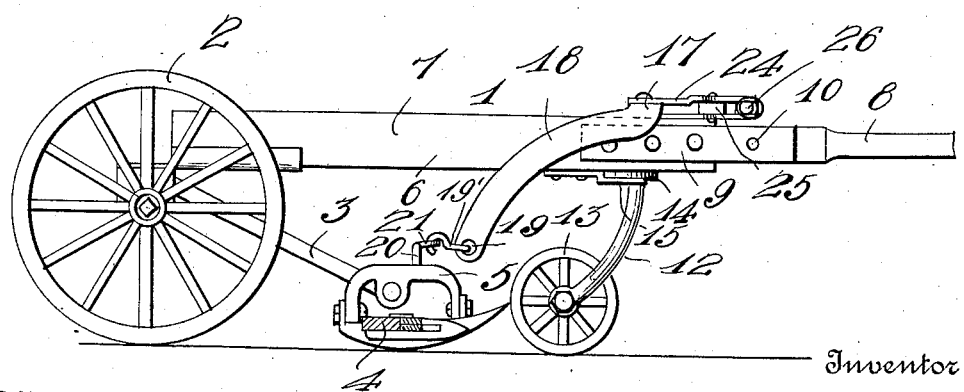

In the accompanying drawings:—Figure 1 is a plan view of a portion of the mowing machine showing the application of the invention; Fig. 2 is a side view of the same; Fig. 3 is a vertical cross sectional view on the line 3—3 of Fig. 1 showing the tongue supporting caster in front elevation; Fig. 4 is a detail perspective view of the draft bar.

Referring more particularly to the drawings, 1 denotes the front portion of a mowing machine frame, 2 denotes the supporting wheels, 3 denotes the sickle bar frame, 4 denotes the sickle bar, and 5 denotes the shoe at the inner end of the sickle bar. These parts may be of the usual or any desired construction.

To the front end of the frame 1 is secured, in any suitable manner, the inner end of my improved draft tongue 6, said tongue comprising an inner stationary section 7, and an outer section 8 which is pivotally connected at its inner end to the outer end of the section 7, as shown. The pivotal connection between the inner and outer sections of the tongue preferably comprises a pair of parallel bearing plates 9 which are preferably bolted to the opposite sides of the inner member of the tongue and project a suitable distance beyond the outer end of said member, as shown. In the projecting ends of the plates 9 are formed alined bearing apertures through which and through the inner end of the outer section of the tongue is inserted a pivot bolt 10 whereby the inner end of the front section of the tongue is pivotally secured between the ends of the plates.

Arranged in the inner section 7 of the tongue adjacent its outer end is a vertically disposed bearing sleeve 11 in which is revolubly mounted the upper end of a caster wheel standard 12 having a forked lower end in which is revolubly mounted a caster wheel 13. On the standard 12 of the caster wheel is arranged a stop collar 14 which bears against the lower end of the sleeve 11 and thus supports the inner portion of the tongue. Secured to the outer side of the inner portion 7 of the tongue is a forked or bifurcated wheel retaining plate 15, the forked outer end of which is engaged with the standard 12 of the wheel immediately below the stop collar 14 and thus serves to hold the upper end of the standard in operative engagement with the sleeve 11. Secured to one side of the inner portion 7 of the tongue is a draw bolt 16 with which is loosely engaged the right angular upper end 17 of a draft bar 18. The end 17 of the bar projects across the upper side of the tongue and is formed integrally with the main portion of the bar, said portion projecting rearwardly and curving downwardly to a point a short distance in advance of the sickle bar as shown. In the rear lower end of the draft tongue is formed an eye 19 to which is connected the forward end of a link 19', the rear hooked end of which is detachably engaged with an eye or loop 21 secured to a bar 20 connecting the inner shoe 5 of the sickle bar and the adjacent portion of the sickle bar frame, as shown. In the upper end of the draw bolt 16 is formed a threaded socket 22 into which is screwed the inner end of a headed retaining screw 23 which is provided to prevent the casual disengagement of the end 17 of the draft bar from the draw bolt.

Pivotally secured to the end 17 of the draft bar is a clevis 24 in the outer end of which is pivotally secured a doubletree 25 to the outer ends of which are connected swingletrees 26 whereby the draft animals are hitched to the machine. On the outer end of the outer section 8 of the tongue is arranged a neck yoke 27 by means of which this end of the outer section of the tongue is supported.

By the employment of the curved draft bar 18 and its pivotal location in respect to the tongue, the lower depending curved end of the same will be substantially on a line with the detachable linked connection to the cutting mechanism, whereby when the draft is applied to the said bar 18, the cutting mechanism will be properly held in respect to the ground, causing the grass to be evenly cut.

By providing the draft bar 18 and connecting the same to the tongue and sickle bar of the machine as herein shown, and described, it will be readily seen that the draft will be equalized and the usual side draft occurring in machines of this character will be eliminated. By forming the tongue in inner and outer sections and providing a wheel support for the outer end of the inner section and the draft devices connected thereto, the weight of the tongue and any side strain of the latter will be removed from the necks of the draft animals.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:—

The combination with the tongue and cutting mechanism of a mowing machine, of a draft bar having an angular substantially horizontal, laterally extending upper end pivotally secured to said tongue, and a depending curved arm, a hook secured to the lower end of said arm, a bar connecting the inner shoe of the sickle bar of the cutting mechanism to the adjacent portion of the frame of the machine, a loop secured to the last said bar with which the hook detachably engages, whereby, when draft is applied to the draft bar the cutting mechanism will be properly held in respect to the ground, and draft appliances attached to the angular extension of the draft bar between its pivotal connection with the tongue and the depending curved arm thereof.

In testimony whereof I have hereunto set my hand in presence of two subscribing witnesses.

JOHN WALTER.

Witnesses:
J. W. GROGMAN,
CHAS. WESTERMAN.